April 11, 1933.    M. M. ROLFSON    1,903,477
ELECTRIC OVEN
Filed March 29, 1932
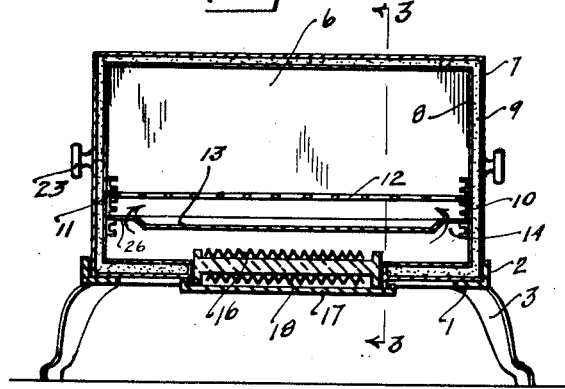
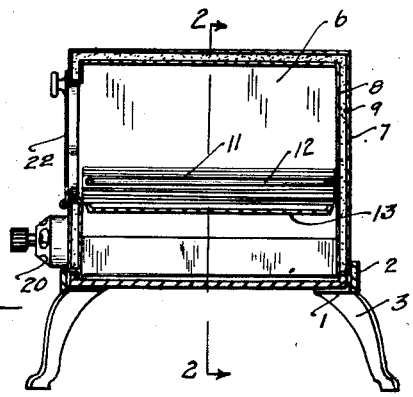
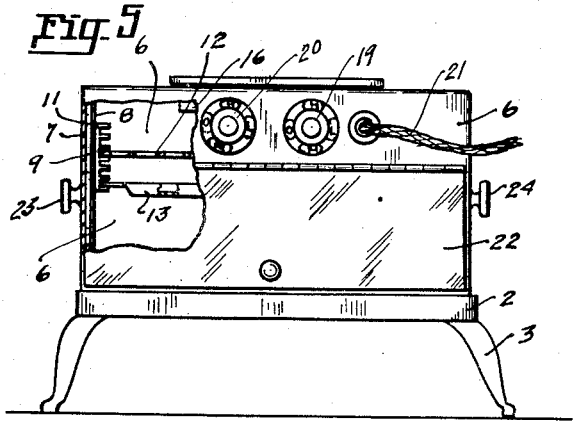
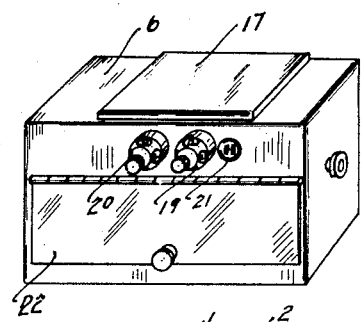
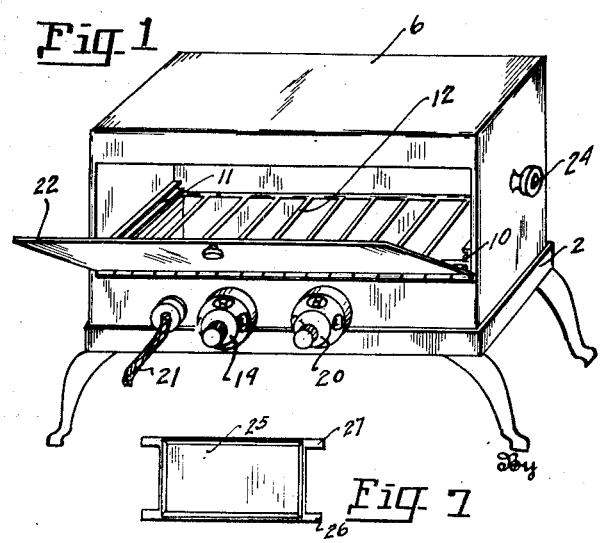
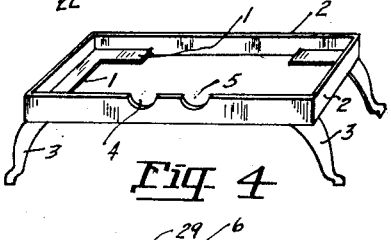
Inventor
Maude M. Rolfson
Thomas Kieger
Attorney Patented Apr. 11, 1933

1,903,477

UNITED STATES PATENT OFFICE

MAUDE M. ROLFSON, OF PORTLAND, OREGON

ELECTRIC OVEN

Application filed March 29, 1932. Serial No. 601,794.

My invention relates to cooking devices and primarily to cooking devices that are electrically heated.

The invention is primarily comprised of a leg supported frame, so made as to adapt the same for being placed and used as upon the dining room, or the kitchen table, or any suitable supporting structure. An electrically heated oven is adapted for being supported upon and within the frame. An oven comprises the primary inner portion of the oven superstructure with supports disposed within the inner walls of the same for supporting a grid therein. A baffle plate is disposed transversely of the oven to cause a circulation of heated air therein. A hot plate is disposed upon one of the primary outer surfaces of the oven structure so that the same may be turned over within the frame and used for frying, or boiling at the same time the oven is being used.

Electrically heated elements are provided for the heating of the oven and for independently heating the hot plates.

One of the objects of my invention consists in providing a simply constructed oven structure that is portable and that may be used with equal facility upon the dining room table, or upon any other suitable support.

A further object of my invention consists in providing a portable oven that may be used with equal facility for baking, boiling and frying, simultaneously.

A further object of my invention consists in so constructing the device that it is comprised of few parts and that it may be used over a relatively long period with freedom from operating annoyances.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective, top plan view, of the leg supported frame and of the oven structure shown in its normal position thereupon with the oven door open.

Fig. 2 is a sectional, side view of the mechanism illustrated in Fig. 1.

Fig. 3 is a sectional, end view, of the mechanism illustrated in Fig. 2, the same being taken on line 3—3 of Fig. 2, looking in the direction indicated.

Fig. 4 is a front view, of the leg-supported frame and a perspective front view of the oven illustrating the oven inverted and in position for use as an oven and as a hot plate, simultaneously.

Fig. 5 is a front view, of the mechanism illustrated in Fig. 4, illustrating the same in assembled position ready for use.

Fig. 6 is an inverted plan view of a modified form of griddle element, in which two heating elements instead of one are used for supplying heat to the underside of the griddle, or hot plate.

Fig. 7 is a plan view of a modified form of drip pan, shown removed from the oven.

Like reference characters refer to like parts throughout the several views.

I preferably form the base frame having walls made of angle members that have a base 1, and upwardly extending side walls 2. Legs 3 downwardly extend from the bottom of the frame for supporting the same. Circular cut-outs 4 and 5 are provided in the top of the side wall members 2 in order that the electric switch terminal blocks may be made to engage therein.

An oven 6 is provided having outer walls 7 and inner walls 8 spaced apart to provide an air space therebetween, or to provide a space that may be filled with an insulated material 9. Supporting members 10 and 11 are disposed within the oppositely disposed walls for adjustably supporting a grid 12, or other suitable support. A baffle plate 13 is disposed transversely of the oven structure. The plate is so positioned that air passageways 14 and 15 are provided between the edges of the baffle and the walls of the oven to thereby permit a circulation of air within the oven structure.

An electric heating element 16 is provided within the oven for the heating of the oven. A hot plate 17 is disposed upon the outside of the oven and the same is adapted for being heated by an electric heating element 18. Electric switches 19 and 20 are provided for passing electric current through the heat element 16 and 18. Electric current is conducted thereinto through the electric conductor 21 to provide easy access to the oven. A hinged door 22 is provided on one side of the oven. To facilitate the turning of the oven to make the hot plate available for use as a griddle, or for frying, or boiling, knobs 23 and 24 are provided upon the ends of the oven, to facilitate the easy turning of the same.

In Fig. 6 I have shown a griddle, or hot plate in which two heating elements 28 and 29 are disposed thereunder, in order that I may supply heat from independent sources to the oppositely disposed ends of the griddle, or hot plate.

In Fig. 7 I have shown a drip pan 25 that is adapted for being placed within the oven and for being placed adjacent and immediately below the griddle 12, so that the hot plate, or griddle, may be used for boiling or frying on the top, and the heat from the heating elements 28 and 29 be adapted for having and securing the drippings from the broilings therein.

Hand-engaging handles, or end supports 26 and 27 are disposed at the oppositely disposed ends of the drip pan to facilitate the same being placed at the desired elevation within the supporting members 10 and 11.

While the form of mechanism herein shown and described is admirably adapted to fulfill the objects primarily stated, it is to be understood that it is not intended to confine the invention to the one form of embodiment in various forms, all coming within the scope of the claims which follow.

What I claim is:

1. In a device of the class described, the combination of a base, having upwardly extending side walls disposed upon the outer surface of the base, legs secured to the underside of the base, an oven adapted for being fitted to and supported upon the base at both its top and bottom sides; the oven being comprised of inner and outer walls spaced apart, insulation being provided therebetween; supporting members disposed upon the inner surface of opposite sides of the oven, a grid, said grid being adapted for being positioned at different points within the supports, one side of the oven being open, a hinged closure for the opening, a baffle spaced apart from the walls of the oven and disposed below and in spaced relation with the grid, an oven heating element being spaced apart from the baffle and adapted for heating the oven, a hot plate disposed upon one side of the oven, an independent heating element for the hot plate and hand supporting and turning knobs disposed upon the oppositely disposed ends of the oven.

2. In a device of the class described, the combination of a leg-supported base, an oven, comprised of inner and outer walls spaced apart by an insulator, adapted for being placed upon the base and for being supported thereby on its top, or bottom surface, an electrically heated oven comprising the major portion of the structure adapted for being supported by the base, an opening disposed in one side of the superstructure and a hinged door adapted for maintaining the opening closed, a hot plate disposed upon the outer surface of one of the primary sides of the oven structure, an independent electrically heated heating element adapted for heating the hot plate, and an electric switch for each of the electric heating elements.

3. In a device of the class described, the combination of a leg-supported base, a superstructure adapted for being placed upon the base and for being supported thereby, either at its top, or bottom side, an oven comprising the primary portion of the superstructure, a hinged door adapted to one side of the superstructure, a hot plate adapted to one side of the superstructure, independent electric heating elements for supplying heat to the oven and for heating the hot plate, and an electric switch adapted for conducting electric current into each of the heating elements.

4. In a device of the class described, the combination of a leg-supported base, a superstructure adapted for being supported upon the base and for being supported upon its top, or bottom side, hand-engaging handles disposed upon the outer surface of the opposite ends of the superstructure, an oven disposed within the superstructure and a hot plate disposed upon the outer surface of one side of the structure, an electric heating element for heating the oven and for heating the hot plate, and an electric switch adapted for conducting current through each of the heating elements.

MAUDE M. ROLFSON.